(12) United States Patent
Rouch et al.

(10) Patent No.: US 11,415,708 B2
(45) Date of Patent: Aug. 16, 2022

(54) MULTIPATH MANAGEMENT FOR GLOBAL NAVIGATION SATELLITE SYSTEMS

(71) Applicant: CENTRE NATIONAL D'ETUDES SPATIALES, Paris (FR)

(72) Inventors: Cédric Rouch, Toulouse (FR); Denis Laurichesse, Tournefeuille (FR); François-Xavier Marmet, Muret (FR)

(73) Assignee: CENTRE NATIONAL D'ETUDES SPATIALES (CNES), Paris (FR)

( * ) Notice: Subject to any disclaimer, the term of this patent is extended or adjusted under 35 U.S.C. 154(b) by 163 days.

(21) Appl. No.: 16/957,716

(22) PCT Filed: Dec. 21, 2018

(86) PCT No.: PCT/EP2018/086514
§ 371 (c)(1),
(2) Date: Jun. 24, 2020

(87) PCT Pub. No.: WO2019/129690
PCT Pub. Date: Jul. 4, 2019

(65) Prior Publication Data
US 2020/0363535 A1 Nov. 19, 2020

(30) Foreign Application Priority Data

Dec. 28, 2017 (EP) ..................... 17306947

(51) Int. Cl.
*G01S 19/41* (2010.01)
*G01S 19/07* (2010.01)
(Continued)

(52) U.S. Cl.
CPC ............ *G01S 19/41* (2013.01); *G01S 19/071* (2019.08); *G01S 19/074* (2019.08); *G01S 19/22* (2013.01); *G01S 19/50* (2013.01)

(58) Field of Classification Search
CPC ........ G01S 19/22; G01S 19/41; G01S 19/071; G01S 19/074; G01S 5/0072; G01S 5/009; G01S 5/0036
See application file for complete search history.

(56) References Cited

U.S. PATENT DOCUMENTS 6,421,000 B1   7/2002  McDowell
7,110,882 B2 *  9/2006  Moser ................... G01S 19/074
                                                        701/472
(Continued)

FOREIGN PATENT DOCUMENTS

DE      197 01 800 A1    7/1998
WO      2018/179550 A1   10/2018

OTHER PUBLICATIONS

Raquet, "Multiple Reference GPS Receiver Multipath Mitigation Technique", Proceedings of the 52nd Annual Meeting of The Institute of Navigation, pp. 681-690, 1996.
(Continued)

Primary Examiner — Cassi J Galt
(74) Attorney, Agent, or Firm — Burris Law, PLLC

(57) ABSTRACT

A positioning device includes a first GNSS receiver; a communication link configured to receive a spatial position, code measurements and carrier phase measurements of a second GNSS receiver; an input interface to a processing logic, the processing logic being configured to: calculate a position of the first positioning device from communicated data; and to estimate one or more parameters representative of multipath at the position of the first positioning device; wherein the communication link is configured to communicate to a second positioning device the parameters representative of multipath at the position of the first positioning device. Described developments comprise the use of multipath severity indicators, the determination of relative distances between receivers, validity conditions in time and/or
(Continued)

space of multipath, various embodiments in a train or in a group of vehicles. Software aspects are discussed.

11 Claims, 3 Drawing Sheets

(51) Int. Cl.
*G01S 19/22* (2010.01)
*G01S 19/50* (2010.01)

(56) References Cited

U.S. PATENT DOCUMENTS

| | | | |
|---|---|---|---|
| 8,423,289 B2* | 4/2013 | Kagawa | G01S 5/0072 |
| | | | 342/357.27 |
| 9,020,755 B1* | 4/2015 | Gazit | G01S 19/41 |
| | | | 701/470 |
| 9,846,241 B2* | 12/2017 | Dai | G01S 19/51 |
| 2013/0335268 A1 | 12/2013 | Enge et al. | |

OTHER PUBLICATIONS

Bitner, et al., "Multipath and Spoofing Detection Using Angle of Arrival in a Multi-Antenna System", Proceedings of the 2015 International Technical Meeting of The Institute of Navigation, pp. 822-832, 2015.

* cited by examiner

MULTIPATH MANAGEMENT FOR GLOBAL NAVIGATION SATELLITE SYSTEMS

CROSS-REFERENCE TO RELATED APPLICATIONS

This application is a National Stage of International patent application PCT/EP2018/086514, filed on Dec. 21, 2018, which claims priority to foreign European patent application No. EP 17306947.7, filed on Dec. 28, 2017, the disclosures of which are incorporated by reference in their entirety.

TECHNICAL FIELD

This document relates to the field of digital data processing and more particularly to Global Navigation Satellite Systems (GNSS).

BACKGROUND

A GNSS receiver position is generally computed based on data received from GNSS satellites. GNSS receivers usually make corrections for receiver clock errors and other effects but there are still residual errors which are not corrected.

Multipath is a dominant source of ranging error in GNSS. Multipath interference occurs when the user device receives reflected signals (e.g. from the ground, buildings, trees, host-vehicle body, etc) in addition to the direct line-of-sight L.O.S. signal. Multipath signals destroy the correlation function shape used for time delay estimation and as a result decrease positioning accuracy.

While open environments are generally not subject to impairments such as multipath, constrained environments are heavily impaired by it. Precisely in these environments, certain applications of GNSS can require improved accuracy (e.g. automated or automatic car).

Some approaches to mitigate multipath are described in the patent literature but present limitations. For example U.S. Pat. No. 6,421,000 entitled "GPS multipath mitigation using a multi-element antenna array" requires a specific antenna, i.e. a modified GNSS device.

There is thus a need for more advanced methods and systems to detect and evaluate multipath.

SUMMARY

A positioning device is disclosed comprising: a first GNSS receiver; a communication link configured to receive a spatial position, code measurements and carrier phase measurements of a second GNSS receiver; an input interface to a processing logic, said processing logic being configured to: calculate a position of the first GNSS receiver from communicated data; and to estimate one or more parameters representative of multipath at the position of the first GNSS receiver; wherein the communication link is configured to communicate to one of the second GNSS receiver and a positioning server said parameters representative of multipath at the position of the first GNSS receiver. Described developments comprise the use of multipath severity indicators, the determination of relative distances between receivers, validity conditions in time and/or space of multipath, various embodiments in a train or in a group of vehicles. Software aspects are discussed.

In an embodiment, multipath (impairing GNSS positioning) is detected and further handled (e.g. mitigated, corrected, etc) for devices actually or potentially located in the vicinity of a given location, and for a limited timeframe.

Advantageously, some embodiments of the invention can allow establishing multipath severity maps, even if temporary ones.

Advantageously, some embodiments of the invention can allow precise GNSS positioning, in particular in/on/of trains or rail transportation systems.

Advantageously, some embodiments of the invention can allow precise GNSS positioning, in particular in/of convoys of vehicles (e.g. groups of cars and/or trucks).

Advantageously, embodiments of the invention can allow precise GNSS positioning, in particular in/of convoys of Unmanned Aerial Vehicles or UAVs (e.g. groups of UAVs either on the ground or in the air).

Advantageously, some embodiments of the invention can allow precise GNSS positioning of parcels in a warehouse or of pedestrians in a crowd.

BRIEF DESCRIPTION OF DRAWINGS

Some embodiments of the present invention will now be described by way of example, for illustration purposes only, with reference to the accompanying drawings in which like references denote similar elements, and in which.

DETAILED DESCRIPTION

Figure 1:
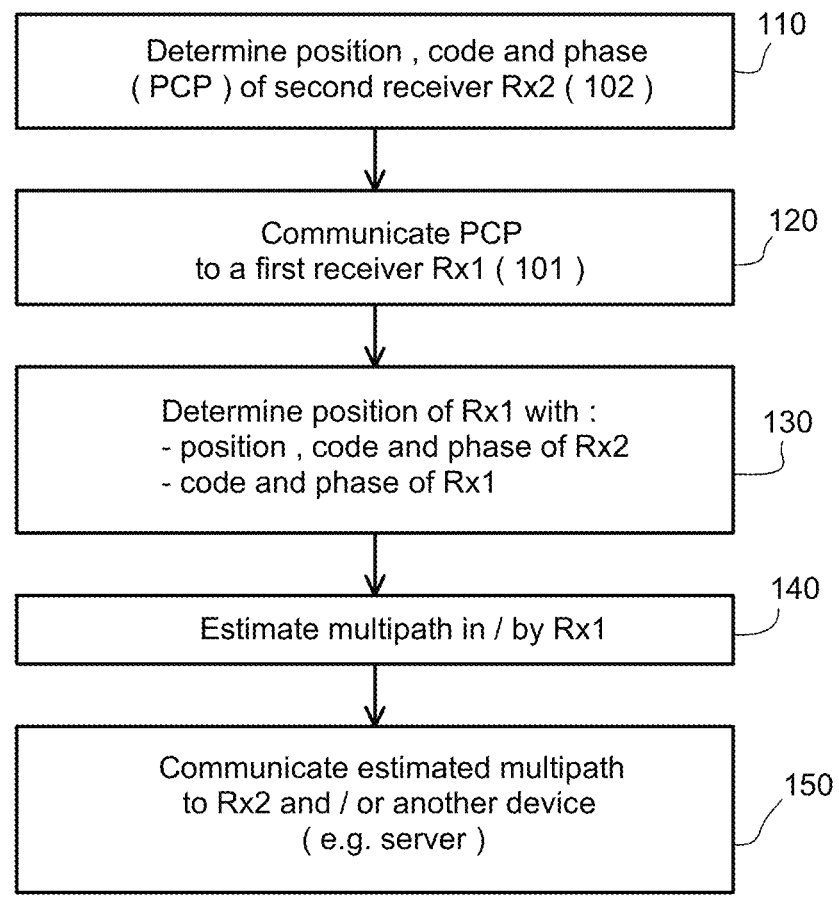
FIG. 1 illustrates examples of steps of an embodiment of the invention.
Figure 1:
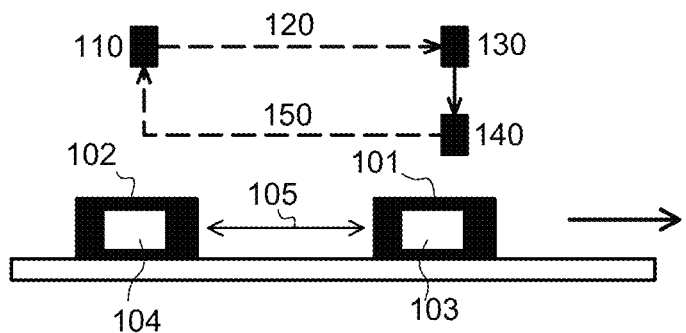

A GNSS receiver can be embedded or be carried out in a (manned or unmanned) vehicle, car, boat, aircraft, UAV, drone, robot or any transportation system. A GNSS receiver also can be carried out by a human user or an animal. A GNSS receiver can access one or more satellite constellations (e.g. GPS, GLONASS, Galileo or Beidou).

There is disclosed a positioning device comprising: a first GNSS receiver; a communication link configured to receive a spatial position, code measurements and carrier phase measurements of a second GNSS receiver (102); an input interface to a processing logic, said processing logic being configured to: calculate a position of the first GNSS receiver from measurements of the first GNSS receiver and the spatial position, the code measurements and the carrier phase measurements of the second GNSS receiver; and to estimate one or more parameters representative of multipath at the position of the first GNSS receiver; wherein the communication link is configured to communicate to one or more of the second GNSS receiver said parameters representative of multipath at the position of the first GNSS receiver.

There is disclosed a system comprising at least a first GNSS receiver and a second GNSS receiver, wherein: the second GNSS receiver is configured to determine its spatial position, code measurements, and carrier-phase measurements and to communicate said information to the first receiver (101); the first receiver is configured to determine its spatial position, by using its own measurements and the position and measurements from the second receiver, and is configured to estimate multipath parameters at said spatial position; the first receiver is configured to communicate said estimated multipath parameters to one or more of the second receiver or a positioning server.

In an embodiment, there is disclosed a positioning device comprising: a first GNSS receiver (101); a communication link configured to receive a spatial position, code measurements and carrier phase measurements of a second GNSS receiver (102); an input interface to a processing logic, said processing logic being configured to: calculate a position of the first GNSS receiver and the spatial position, the code measurements and the carrier phase measurements of the second GNSS receiver; and to estimate one or more parameters representative of multipath at the position of the first GNSS receiver; wherein the communication link is configured to communicate to one or more of the second GNSS receiver or a positioning server said parameters representative of multipath at the position of the first GNSS receiver.

In some embodiments, another entity than GNSS receivers can be involved in the handling of multipath. A positioning server can be accessed indeed, and can contribute to the positioning.

The first GNSS receiver can communicate with the second GNSS receiver and/or the positioning server. In an embodiment, the first GNSS receiver can communicate only with the second GNSS receiver (i.e. no server). In an embodiment, the first GNSS receiver can communicate only with the server (i.e. no second GNSS receiver). In an embodiment, the first GNSS receiver can communicate both with the second GNSS receiver and the server.

The term "server" (in the expression "positioning server") designates a collection of one or more physical servers. These generic servers are configured specifically to handle GNSS data (specifically multipath data). The perimeter of said collection can evolve over time and/or space.

Servers can be locally and/or remotely accessed (e.g. via APIs). For example, in an embodiment the server can be mounted on a train. In an embodiment, the server is remotely accessed (cloud computing).

In some embodiments, a GNSS receiver can connect to the server via I/O communication resources (e.g. in 3G, 4G, 5G, Wi-Fi, etc) and upload its data (for example since its last connection, or the entirety of its records). Such a connection can occur continuously, as often as possible given network status, or from time to time, i.e. be intermittent or regular or irregular or even opportunistic when a connection is possible.

A server generally comprises computing and memory/storage resources. One or more servers can receive data from GNSS receivers, determine, compute, correct or otherwise modify multipath data and serve them back to GNSS receivers. Data communications between receivers and servers can be unidirectional (for example data push only) or can be bidirectional (data pull and push).

In some embodiments, the (positioning) server can collect and process data stemming from a plurality of G.N.S.S. receivers. Data received in the server can be post-processed, i.e. enriched by cross fertilization with other data (building multipath maps or quantized grids).

It is important to notice that in some embodiments indeed, the second GNSS receiver is not required (not an essential feature) a server can be remotely accessed (the "intelligence" can be distributed in the network).

In an embodiment, the second receiver is further configured to determine its position with said multipath parameters. This latter feature of the second receiver is not required. Such multipath parameters are not necessarily accurate at the second receiver location. The second receiver for example can merely store/log multipath. Also, in some embodiments, the second receiver may not receive any data.

In an embodiment, the system further comprises a third GNSS receiver (Rx3), said GNSS receiver being configured to communicate with said first and/or second GNSS receiver. By the term "communicate" (or "cooperate"), it is intended to designate the steps previously described. A "cascade" of receivers can be implemented indeed (the method can be performed iteratively). The described cooperation scheme between Rx1 and Rx2 can be repeated, for example with another (third) receiver, or other receivers. In an embodiment, a vehicle (for example a train) comprises a number N of GNSS receivers. Different cooperation schemes are possible. In one embodiment Rx1 can endorse a specific role ("master" receiver): it can cooperate with Rx2, the same Rx1 can cooperate with Rx2, and the same Rx1 can cooperate with Rxi, until RxN, N being an integer>1. In an embodiment, Rx1 can cooperate with Rx2, while Rx2 can cooperate with Rx3, Rxi can cooperate with Rxi+1 and RxN−1 can cooperate with RxN, N being an integer>1. In some other embodiments, a more complex graph of relationships can be implemented (for instance, roles can by dynamically allocated and reallocated between receivers, for example as determined by a centralized logic). A centralized logic for instance can be embodied in one or more remotely accessed servers which orchestrate the relationships between receivers. In some other models, the receivers are linked in a distributed model (e.g. peer-to-peer exchanges). Such embodiments can be advantageous for example in the case of a complex and evolving set of vehicles (e.g. automated cars).

Rx1 is the receiver (located upstream in the example of a moving train), which estimates multipath. Rx2 (102) is the receiver of «reference», located downstream. Rx2 determines its position precisely and accurately (with GNSS code, optionally assisted with other positioning sensors) and transmits a) its position along b) the date at which is determined this position c) code and phase measures (with time data), along with an optional d) indicator of quality to Rx1. Rx1 in turn determines its position. In an embodiment, Rx1 determines its position with the measures and position of Rx2, then determines multipath (MP), by using residuals computed at the reference position. Rx1 then transmits MP (and/or quality indicators) to Rx2. The second receiver Rx2 can use and leverage said multipath when it will be further located at the position previously occupied by Rx1 at which said multipath MP had been first estimated, so as to improve the accuracy/reliability of its further positioning.

The interaction between Rx1 and Rx2 can follow different schemes. For example, upstream Rx1 transmits multipath to downstream Rx2 (unidirectional communication). In some embodiments, the interaction can be bi-directional (feedback from Rx2). In another embodiment, Rx1 and Rx2 may switch roles. Rx1 can become the reference receiver role. In some embodiments, more than two receivers can be involved: one or more receivers can act as relays in a chain. Multipath can be iteratively estimated (even if multipath can vary over time).

Rx1 and Rx2 may not follow the same path. In the example of a multilane freeway, Rx1 and Rx2 may travel along different lanes of traffic even in different directions. In another example, Rx1 and Rx2 may be on different roads, path or trajectories. One receiver can be travelling on the freeway, the other traveling on a country road in the vicinity of the freeway. The country road may experience multipath and signal attenuation due to tree foliage while the freeway has a clearer multipath environment. In other examples, freeways may be subjected to multipath or signal attenuation (e.g. in tunnels or underpass) while nearby roads have a clearer multipath environment.

In some embodiments, the first receiver Rx1 "pushes" its multipath estimation towards the second receiver. In additional embodiments, the second receiver Rx2 "pulls" the estimated multipath from Rx1. It is observed that transmission delay times generally do not affect steps of embodiments of the method(s).

In an embodiment, the first receiver Rx1 is configured to communicate one or more multipath severity indicators.

In some embodiments, the mere presence or absence of multipath can be determined (binary answer, i.e. present or absent). In some embodiments, multipath can be quantized or quantified. Severity indicators can de determined: thresholds schemes can be applied. For example, if amplitude and relative delays are in excess of predefined thresholds (e.g. 0.3 ms or 10 meters), the environment will be qualified as severe. A receiver or an entity relaying the information associated to multipath can thus determine multipath presence (given a predefined value, i.e. a binary response yes or no) or a multipath intensity level or "severity" (quantization of multipath impact). In an embodiment, the severity can be quantified in three levels, e.g. "severe", "low" and "no impact". Severity levels can be absolute (e.g. for a given location or area on the map, expressed as longitude, latitude and possibly altitude) or be time relative (e.g. at different instants of the day or function of satellites' position in the sky). In addition, some patterns can be determined (e.g. certain locations can have different thresholds, for example in rural areas by contrast with dense urban areas).

In the example of a moving vehicle, the information that multipath can become severe at a coming location can trigger counter-measures, reactions or adaptations.

In an embodiment, the relative distance between the first and the second receivers is determined.

The relative distance or position between receivers can be determined in many ways. In an embodiment, double differences of GNSS measurements can be used. Geometrical constraints also can be used to further improve the determination of this relative distance.

The knowledge of the geometry of the arrangement (possible trajectories) of receivers can improve the accuracy of positioning (it is not required to make or receive any assumption about this geometry). Advantageously, the underlying geometry between receivers can be taken into account to further improve the accuracy and reliability of positioning). In the example of a train composed of wagons, their trajectory is constrained to a certain degree by the railroad.

The relative distance between receivers can be received and/or it can be computed and/or it can be measured. LIDAR for example can be one amongst the many techniques which can be used to measure relative distance between vehicles.

The first and second receivers (and other associated receivers) are generally mobile. Yet in some embodiments, one or more receivers can be mobile while some others can be affixed to the ground (or buildings or bridges, etc).

In some embodiments, receivers of the plurality of receivers can follow similar trajectories. Trajectories of receivers can be highly correlated in a train. In automated convoys of vehicles (e.g. trucks, with coalescence phenomena i.e. transitory geometries, etc), the similarity of trajectories can depend on implemented servo-controls or control loops. Independent vehicles circulating on the same road follow external constraints and geometry remains bounded.

The geometry of the arrangement (possible trajectories) of receivers can be known, at least to a certain extent. The geometry can evolve over time and the associated dynamic can be known (entirely or in part), thereby constraining the technical problem and solution. The geometry, or relative distance, can be known a priori or can be estimated/calculated/determined (in various ways, for example depending on situations e.g. train, servo-system or convoy of vehicle, fleet of independent vehicles, etc). Conditions and tolerances can be taken into account to determine possible evolutions. For example, road speed limits can be taken into account to bound trajectories, maximal track curvatures for trains, etc).

Such knowledge of the geometry can allow improving the absolute positioning of Rx2 and/or the relative positioning of Rx1 (compared to the one of Rx2).

The receiver Rx2 can determine its position on its own (aided by multipath parameters communicated by Rx1) and/or with additional knowledge of such geometry. The receiver Rx2 also can compare its "independently-defined" position with its "theoretical" position stemming from geometry considerations.

In an embodiment, the position of the first and/or the second receivers is determined by one or more of odometry and/or inertial measurement and/or image-recognition.

In an embodiment, the relative position of one receiver with another one is determined by one or more of optical and/or radar and/or radio-frequency signal measurement. In some embodiment, the absolution (longitude, latitude, altitude) position of one receiver may be determined to combine the relative position of the receiver with another one. The latter having a determined absolute position. For example, a moving vehicle in a particular multipath environment can be followed by a second vehicle in a clearer environment. The relative position of the first vehicle is obtained for example by LIDAR or an optical measurement by the second vehicle. And the second vehicle GNSS receiver has computed its absolution position, velocity and time (PVT). The absolute position of the first vehicle is then determined.

In embodiments directed to convoys of vehicles, wherein the geometry between receivers continuously changes, intensive data exchanges can continuously reconfigure the handling of data. For example, data filters can be implemented, in receivers or in intermediate entities (relays, centralized servers, etc). Data filters can be configured in different manners, e.g. upstream before multipath data upload or download because of probable inconsistencies with other devices' data. In an embodiment, outlier devices can be removed by using predefined thresholds or ranges of thresholds. For example, if a multipath is rarely detected at a given location (under a predefined threshold, by reference to a centralized database) it would then be ignored or filtered out.

For example, in a convoy of vehicles (which for example are not synchronized with one another, i.e. follow independent trajectories), the multipath determined by a receiver Rx1 can be temporarily stored (centralized storage in the cloud or distributed storage among vehicles) and conditionally reused by downstream vehicles (if multipath parameters determined by a vehicle at a given point in space and in time are not considered as obsolete).

In an embodiment, multipath parameters are associated with validity conditions in time and/or space.

Multipath is linked to the position of a satellite in the sky. Since GNSS satellites are moving in the sky relative to a fixed position on earth, multipath generally evolves over time. Temporary obstacles can lead to more reflections and flawed positioning. For example, a GNSS device located in the vicinity of a truck may record high values of multipath which wouldn't be seen by other devices at a later moment. Even in one fixed location, for example in the middle a street with tall buildings on both sides, multipath environment, for each GNSS satellite viewed from that position, may evolve over time.

In some embodiments, multipath maps can be handled.

While the invention at first focuses on short-term uses of estimated multipath, in the longer run, multipath data stemming from a plurality of receivers can be "evaded", i.e. be collected and consolidated for longer term uses (e.g. statistics). Collaborative and transient multipath maps can for example be established (e.g. statistical analysis for urban planning etc).

Multipath information may be stored on a map or on a database. Such information may be displayed as a layer over existing map information (web maps). In an embodiment, for example, Rx1 can create a multipath map, and Rx2 can use this map. In some embodiments, Rx2 can contribute, along with others connected.

Time passing by and/or by accumulating data, reliable multipath maps can be created. The more traffic, the more data. The refresh rate and accuracy of multipath correction values is generally proportional to traffic. Where intense traffic can be observed, lots of data can be used to mitigate multipath. In urban areas associated with dense traffic (e.g. highways, shopping centers, etc), significant amounts of data can be collected and efficient further multipath management (e.g. correction, suppression, mitigation, etc) can be performed. In deserted or empty areas, the gathering of data may take some more time (but at least some data is available). Multipath maps can be used to correct local measures, and/or to improve PVT estimation and/or to adapt the navigation strategy. Updated maps can be retrieved on demand (occasionally or regularly). In crowded areas, i.e. with more data, the refresh rate of maps and following the effectiveness of corrections can be superior. In some embodiments, multipath data can be collected for every possible elevation and azimuth for every possible G.N.S.S. satellite.

In an embodiment, multipath is estimated satellite by satellite in a GNSS constellation. Since each GNSS satellite in one constellation has an ID, multipath may be estimated for each couple (constellation ID, satellite ID). In an embodiment, multipath can be estimated for a plurality of satellites of a GNSS constellation. Multipath can be estimated for one or more constellations (e.g. GPS/Galileo/GLONASS/BeiDou).

In an embodiment, only one GNSS constellation is taken into account. In some embodiments, a plurality of constellations can be taken into account (e.g. some constellations can be ignored or filtered out or excluded). In some embodiments, all constellations (or each accessible constellation) can be taken into account.

Within a constellation, one or more satellites can be taken into account. Some satellites can be ignored or filtered out or excluded. In some embodiments, satellite elevation and other parameters may be used to either include or exclude satellites.

Between times ti and ti+1, the receiver Rx2 can continue to determine its position in different ways. The second receiver Rx2 can use internal or external resources to estimate in advance or proactively the time at which it will be occupying the position of upstream first receiver Rx1 (and at which it will be receiving estimated multipath).

In some further embodiments, GNSS augmentation can be used. GNSS augmentation designates methods of improving the navigation system's attributes, such as accuracy, reliability, and availability, through the integration of external information into the calculation process. In an embodiment, satellite-based augmentation system (SBAS) can be used (e.g. WAAS in the USA, EGNOS in Europe, SDCM in Russia, QZSS in Japan, IRNSS in India, etc).

Advantageously, the duration of valid/stable multipath can be increased with such augmentations. In some embodiments, in substitution or in addition, ground-based augmentation system (GBAS) and/or ground-based regional augmentation system (GRAS) can be used.

By using SBAS augmentation, accuracy can be increased (diffusion of corrections) and the trust in such systems is reinforced, as well as integrity (e.g. validity messages). Some of SBAS satellites can be used in "geo-ranging" modes (i.e. to perform pseudo-ranges with such satellites). Likewise, multipath can be estimated for these types of satellites.

In an embodiment, the first receiver and the second receiver are mounted on a train. In an embodiment, the first receiver (101) is mounted on one train and the second receiver is mounted on a different train.

In an embodiment, the first receiver (101) is mounted on a train and the second receiver is not mobile.

In an embodiment, the second receiver is not mobile (in earth/ground referential).

In an embodiment, the first receiver and/or the second receiver are mounted in/on/onto/inside a vehicle.

A vehicle can be unmanned. A vehicle can serve different purposes (emergency, military, transportation of goods and/or passengers, utility, etc). A vehicle can be a bicycle, a scooter, a kart, a car (e.g. autonomous), a bus, a truck, a tractor, a train, a plane, an aircraft, a drone, an helicopter, a robot, a spacecraft, a missile, a boat, a ship, etc.

In an embodiment, the estimated one or more parameters representative of multipath on a satellite axis is a residual difference between measured and predicted code pseudo-ranges after deduction of modeled errors, and wherein the modeled errors comprise satellite clock errors, receiver clock errors, ionospheric errors and tropospheric errors.

In an embodiment, the estimated one or more parameters representative of multipath comprise the residuals at the first positioning device, said residuals corresponding to the difference between the measured and the predicted/estimated code pseudo-ranges or carrier-phase measurements.

When the first receiver Rx1 estimates its position, it also estimates the "residuals" which designates the difference between the measured and the predicted/estimated code pseudo-ranges or carrier-phase measurements. Residuals comprise the receiver position error and clock offsets, plus mismodelling and measurement noise errors. The value of these residuals allows estimating multipath impairing or affecting the measures of code for the first receiver Rx1 at the moment of computation and at its considered location. All errors which are not due to multipath are supposedly taken into account (i.e. appropriately modeled or negligible, for example compared to desired performances).

There is disclosed a computer-implemented method of handling multipath with at least two Global Navigation Satellite System receivers, the method comprising the steps of: the second receiver determining its spatial position, code measurements, carrier-phase measurements; the second receiver communicating its spatial position, code measurements, and carrier-phase measurements to a first receiver; the first receiver determining its spatial position, by using its own measurements and the position and measurements from the second receiver, and estimating multipath parameters at said spatial position; the first receiver communicating said estimated multipath parameters to the second receiver; and the second receiver determining its position with said multipath parameters.

Steps of the described method generally can be implemented in standard or existing GNSS receivers (no hardware modifications, to the exception of communication capabilities, if not already present). GNSS devices can execute a software program which can embody one or more of the described steps. An existing receiver can be modified in order to be able to receive and handle measures originating from another receiver and to use algorithm/steps for determining multipath.

In an embodiment, the method further comprises the second receiver determining and communicating an indicator of the estimated accuracy of its determined spatial position to the first receiver.

In an embodiment, the method further comprises the first receiver determining its spatial position, with respect to the second receiver using its own GNSS measurements and the received position and measurement of by differential positioning.

In an embodiment, the method further comprises repeating steps for another satellite of the GNSS constellations and/or at a later time (moments or instants in time, e.g. $t_j > t_i$, with i and j integers).

Steps of the method can be reiterated. A new estimation at Rx1 can be communicated to Rx2 to further improve the positioning of Rx2 or of another following receiver with the estimation performed at Rx2 etc.

In an embodiment the positioning server comprises a processing logic configured to determine an estimate of a second position of the positioning device from the first position of the positioning device.

The estimate of the second position can be determined in different ways. In an embodiment, the server receives, temporarily stores and sends back parameters representative of multipath at the position of GNSS over time. In some embodiments, the server receives and/or manipulates data from other data sources (for example inertial data, image recognition, etc). The server also can solicit other data sources to determine multipath values or correction values (the remote servers advantageously can post-process or significantly enrich multipath data).

In an embodiment, the determination of the estimate of a second position of the positioning device is obtained by the replacement of the residuals calculated at the first position by the one or more parameters representative of multipath at the first position.

In an embodiment, the server can receive, store and restitute the residuals or parameters representative of multipath at the position of the first GNSS receiver. The server then can determine or estimate a second position of the positioning device, by replacing the residuals calculated at the first position by the one or more parameters representative of multipath at the first position. In some embodiments, the replacement (the computation) is not necessarily performed in/by the server (acting as a cache for multipath data) but can be performed in other (networked) devices (including GNSS receivers).

In an embodiment, there is disclosed a computer-implemented method of handling multipath with at least two Global Navigation Satellite System receivers, the method comprising the steps of: the second receiver determining its spatial position, code measurements, carrier-phase measurements; the second receiver communicating its spatial position, code measurements, and carrier-phase measurements to a first receiver; the first receiver determining its spatial position, by using its own measurements and position and measurements of the second receiver, and estimating multipath parameters at said spatial position; the first receiver communicating said estimated multipath parameters to one or more of the second receiver or a positioning server; and the second receiver determining its position with said multipath parameters received from one or more of the first GNSS receiver and the positioning server.

In an embodiment, the method further comprises the step of the second receiver determining and communicating an indicator of the estimated accuracy of its determined spatial position to the first receiver.

In an embodiment, the method further comprises the step of the first receiver determining its spatial position, with respect to the second receiver using its own GNSS measurements and the received position and measurement of by differential positioning.

In an embodiment, the method further comprises the step of repeating steps for another satellite of the GNSS constellations and/or at a later time.

There is disclosed a computer program comprising instructions for carrying out one or more steps of the method when said computer program is executed on a computer device.

Further embodiments are now described.

FIG. 1 illustrates examples of steps of an embodiment of the invention.

In an embodiment, the system according to the invention comprises two receivers 101, 102. The receivers 101, 102 include processing logic 103, 104, respectively, and the receivers 101, 102 communicate via communication link 105. The "first" receiver Rx1 (101) and the "second" receiver Rx2 move substantially in a same direction. In such an arrangement, the first receiver can be located "upstream" (or ahead) and the second receiver can be located "downstream" (or behind), in view of the direction of collective displacement. The first receiver is thus the first one to encounter obstacles causing multipath, if any.

In an embodiment, the second receiver Rx2 (102), located downstream, determines its position, code and phase (PCP). It then communicates said PCP to the first receiver Rx1 (101), located upstream, which determines its position thanks to the position, code and carrier-phase measurements of Rx2 and the code and carrier-phase measurements of Rx1. The receiver Rx1 determines or estimates multipath and communicates said multipath (parameters) to Rx2.

At step 110, a second receiver Rx2 (102) determines its spatial position (i.e. by PVT algorithm), along its GNSS measures of code and phase. In other words, the position of the receiver Rx2 is known with a sufficient precision (for example with an error margin inferior to a predefined threshold, said threshold being for example function of errors which shall be detected, e.g. multipath errors or other errors). The position can be determined directly by the receiver Rx2 itself or indirectly (e.g. by using one or a combination of odometry, Inertial Measurement Unit, camera and vision-based algorithm, etc).

At step 120, the spatial position of the second receiver Rx2, along with GNSS measures of code and phase are communicated to a first receiver Rx1 (101). The GNSS position of the receiver Rx1 is unknown a priori.

At step 130, the first receiver Rx1 (101) determines its spatial position by using the spatial position, code and carrier-phase measurements of Rx2 and the code and carrier-phase measurement of Rx1 along at least four satellite axes. In other words, the first receiver Rx1 determines its position thanks to its own measures and/or calculations, in addition to measures of the second receiver Rx2 and to the position of Rx2. In an embodiment, the determination of the positioning is a differential positioning (for example by using a double difference of the measures of the carrier-phase). Once the first receiver Rx1 estimates its position, it also estimates the residuals at a reference point which is further defined. The term "residuals" designates the difference between the measured and the predicted/estimated code pseudo-ranges or carrier-phase measurements. Residuals comprise the receiver position error and clock offsets, plus mismodelling and measurement noise errors. As described below, most components of the residuals can be modeled using different methods. According to some aspects of the invention, the difference between the residuals and the errors and terms known from a model will give an estimate of multipath impairing or affecting the measures of code for the first receiver Rx1 at the moment of computation and at its considered location.

In some embodiments, validity parameters in space and/or in time can be associated with estimated multipath. For example, the first receiver Rx1 can be moving, relatively to Rx2. Regarding time, estimated multipath can be considered valid during a few seconds (up to several minutes in particular applications). Regarding space, an exemplary value (sphere or distance for valid multipath) can be 1.5 meters. Such controlled obsolescence/validity of multipath can be advantageous in specific embodiments (e.g. convoys of vehicles). Validity/obsolescence metadata associated with multipath can be stored and used in various ways. The storage can be distributed physically (e.g. distributed memory units in the environment and/or in receivers in vehicles) and/or logically (e.g. in the Cloud). The use of such metadata can be diverse (for example, said validity/obsolescence metadata can be communicated along the communication of multipath parameters between vehicles).

At step 140, the first receiver Rx1 evaluates or estimates multipath parameters, according to any known approach.

At step 150, multipath information is forwarded to one or more devices.

In an embodiment, the first receiver Rx1 communicates said estimated multipath parameters to the receiver Rx2.

In an embodiment, the first receiver Rx1 communicates said estimated multipath parameters both to the second receiver Rx2 and to a third receiver Rx3, which is likely to be located at a location close to the one of Rx1 a few moments later. In other words, when another receiver (e.g. Rx2 or Rx3) is—or happens to be—located in the vicinity of the position of the first receiver (i.e. close physical proximity where the multipath have been estimated by Rx1, typically within a specified range) and within a specified timeframe, said another receiver Rx2 or Rx3 can modify (e.g. mitigate, correct, ponderate, improve, refine, contextualize) its own measures thanks to the estimated multipath. Obsolescence/validity of multipath can depend on multiple parameters, comprising the moving speed of receivers, environmental conditions, etc. The specified range for example can be dependent on the configuration of the terrain/ground traversed by the vehicles in motion. On a highway borderer constantly by identical or similar buildings, the multipath estimate may be valid for tens of meters, but a discontinuity may be introduced by a change of the terrain, for instance at an exit of the highway. The amplitude of the specified timeframe can also depend on the speed of change of angular elevation of the satellites in view. Since the satellites travel a full orbit in about 12 hours, this gives a speed of change of about 30 degrees per hour (depending on the inclination of the orbit), or half a degree per minute. In other words, since a change of 5° will not affect much the trajectories of Line of Sights signals, a validity of around 10 minutes can be acceptable. Such a range can be changed in case of a mobile obstacle, like a train or a lorry, would come close to the receiver and change the secondary multipath reflections.

Advantageously, the geometry of roads can be taken into account to improve the accuracy and/or reliability of the determination of the positioning. For example, it can be advantageous to take into account shorter distance/time of validity, especially when the trajectory of the vehicles is very deterministic like in case of different wagons of a train.

Advantageously, multipath maps (e.g. cartography, geographic information systems) can be used to improve the accuracy and/or reliability of the positioning, for example as references external to receivers.

According to the invention, multipath effects also include signal attenuation, full or partial between GNSS satellites and GNSS receivers. GNSS signal jamming or GNSS signal spoofing can be handled in some embodiments. For example, jamming or spoofing can be detected at steps 130 and/or 140, in the embodiment described in FIG. 1. In addition, residuals can be used to further detect, locate, or characterize such jamming or spoofing environment.

Some embodiments of the invention can implement a two-step GNSS integrity mechanism while determining a GNSS Position Velocity and Time (PVT). For example, if both PVT values determined by Rx1 according to embodiments of the invention and PVT values determined according to the state of the art are considered identical (modulo predefined margin(s)), then the integrity of the GNSS PVT can be confirmed.

In some embodiments, multipath maps (e.g. cartography, geographic information systems) comprising signal attenuation and/or jamming and spoofing can be used to improve the integrity and/or reliability of the positioning, for example as references external to receivers.

In some embodiments, GNSS jammer(s) or spoofer(s), fixed or mobile, can be detected and tracked. Triangulation for example can be performed in order to pinpoint jammer or spoofer location and/or velocity and/or time.

In an embodiment, the receiver Rx1 does not communicate said estimated multipath parameters to the second receiver Rx2 but it does communicate the multipath parameters to a third receiver Rx3, which is—or is likely to be—located in space at a location close to the one of Rx1, later in time.

In an embodiment, the receiver Rx1 communicates said evaluated multipath parameters to a remote server, said remote server being configured to handle, analyze, process and further redistribute multipath parameters.

Some more details of the computations are now provided.

The (approximate) position in space of Rx1 (x,y,z) can be known or determined. For example, it can be known from previous calculation cycles or from a value determined on initialization of the GNSS receiver (that may be the last calculated value after the receiver is powered off). An approximate position is not strictly required. The position of Rx1 can be deduced from the PCP of Rx2 for example by double difference. More precisely, by knowing the position of Rx2, it becomes possible to determine the position of Rx1, thus the term Di of equation 1).

The receiver clock bias $Cb_{REC}^{SYST}$ of Rx1 associated with this position is not known.

Errors (all of them) which are not due to multipath are supposedly taken into account and appropriately modeled (or negligible compared to desired performances). The model—or the combination of models—take into account all sources of errors e.g. troposphere, ionosphere, according to state-of-the-art techniques, including dual-frequency iono-free combinations.

The measure of pseudo-distance $PR_i$ corresponds to the measure of code performed by Rx1 for a satellite i, which can be generally modeled as:

$$PR_i = D_i(x,y,z) + c^*(Cb_{REC}^{SYST} - Cb_{SATi}^{SYST}) + e_i + T_i + MP_i + \varepsilon \quad \text{(equation 1)}$$

wherein $D_i$ (x, y, z) being the geometrical distance between the antenna of the first receiver Rx1 and the satellite I. $D_i$ is known once the position of Rx1 is known thanks to the differential positioning with Rx2 and the accurate knowledge of Rx2's position;

wherein $Cb_{REC}^{SYST}$ is the clock bias between the clock of the first receiver Rx1 and the system time of the GNSS constellation "SYST" being used. This bias is not known;

wherein $Cb_{SATi}^{SYST}$ is the clock bias between the clock of the satellite i and the system clock. This bias can be estimated thanks to the navigation message broadcast by GNSS satellites;

wherein $e_i$ (resp $T_i$) corresponds to the error due to the travel through the ionosphere (respectively troposphere), which can be modeled by theoretical $e_{theo}$ (respectively $T_{theo}$) or which is eliminated by dual-frequency combinations (for $e_i$);

wherein $MP_i$ corresponds to the error due to multipath impairing satellite i, which parameter is not known and which is to be determined;

wherein c is the speed of light in vacuum, and wherein E is the sum of other errors (e.g. the noise impairing the pseudo-distance, said noise being supposedly of Gaussian distribution).

The model of pseudo-distance $PR_i^{theo}$ can be expressed without $MP_i$ as:

$$PR_i^{theo} = D_i(x,y,z) - c^*Cb_{SAT}^{SYST} + e_{theo} + T_{theo} \quad \text{(equation 2)}$$

The bias of the receiver $Cb_{REC}^{SYST}$ at instant time t can be estimated by computing statistical moments (e.g. mean, median) of values $PR_i - PR_i^{theo}$.

Errors due to multipath (for each satellite i) can be estimated by:

$$MP_i^{estimate} = PR_i - PR_i^{theo} - c^*Cb_{REC}^{SYST} \quad \text{(equation 3)}$$

In view of these elements, some data can be communicated between Rx1 101 and Rx2 102. Some data can be advantageously communicated, for example quality indicators or code and/or carrier-phase measurements. Some data is generally required to perform differential positioning (at least code measurements and position of Rx2).

From Rx2 (downstream) to Rx1 (upstream), said communicated data can comprise the precise location of Rx2 and one or more quality indicators associated with said position of Rx2 (e.g. Doppler, signal-to-noise ratio, etc), measures of code (pseudo-ranges) and carrier-phase.

From Rx1 (upstream) to Rx2 (or to another receiver Rx3 located downstream or to a server remotely accessed), there can be transmitted data comprising estimated multipath (for example for one or more satellites, if not each or all satellites), along with the dates (time) and positions (space) when and where these estimations have been performed.

In the general model, Rx2 may be mobile but, in some embodiments, Rx2 may also be immobile (not moving, invariant or fixed position).

Exchanges of data between Rx1 and Rx2 can be direct (with no intermediary entities) and/or indirect (for example via a base station or relay).

In some embodiments, the geometry of Rx1 and Rx2 can be specific. For example, in some embodiments Rx2 can be moving, as Rx1 does. In addition, in some embodiments, Rx2 (101) can reach a point previously occupied by Rx1 (102) (this embodiment is described in more details on the FIG. 2, where the exact same positions are occupied over time, in a predictable manner). In some embodiments, Rx2 can reach positions close to ones previously occupied by Rx1, in a less predictable manner).

In some embodiments, the geometry of Rx1 and Rx2 can be loose. For example, in some embodiments Rx2 can be moving, as Rx1 does, but in any direction relative to Rx1. In addition, in some embodiments, Rx2 can reach a point in the vicinity of Rx1 location but sufficiently different to experience different multipath environments.

In some embodiments, multipath parameters can be quantified or quantized. One or more thresholds (or ranges of thresholds) can be used to filter out data before communications between receivers. For example, non-critical multipath (parameters inferior to one or more predefined thresholds) may not be transmitted. A contrario, critical multipath also can be signaled (e.g. broadcast), for example with high priority, to other receivers (for example if the communication bandwidth between receivers is limited).

Figure 2:
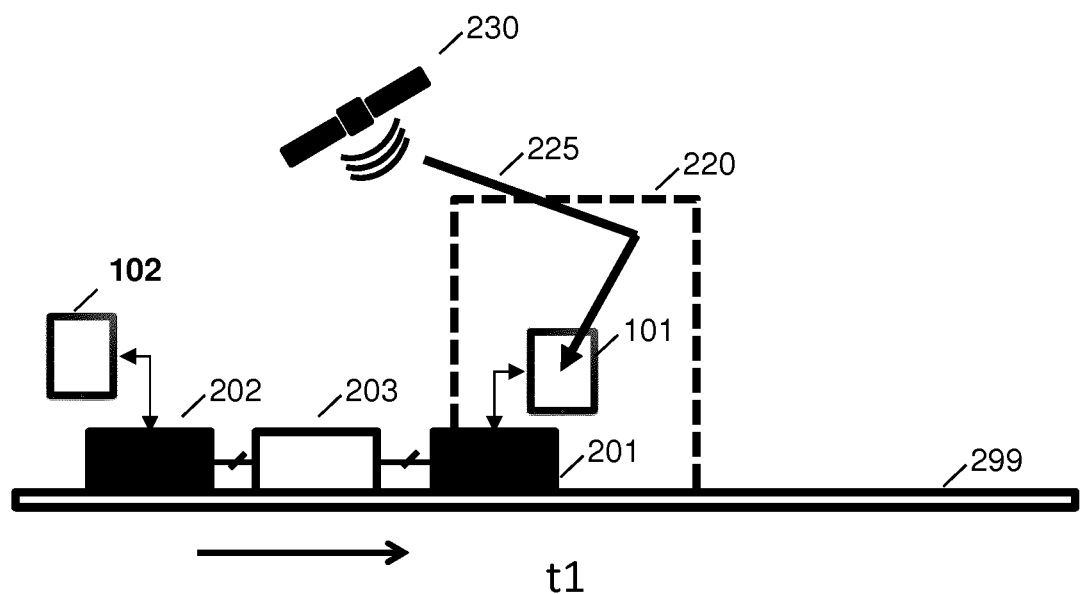
FIG. 2 illustrates an embodiment of the invention for rail transportation systems.
Figure 2:
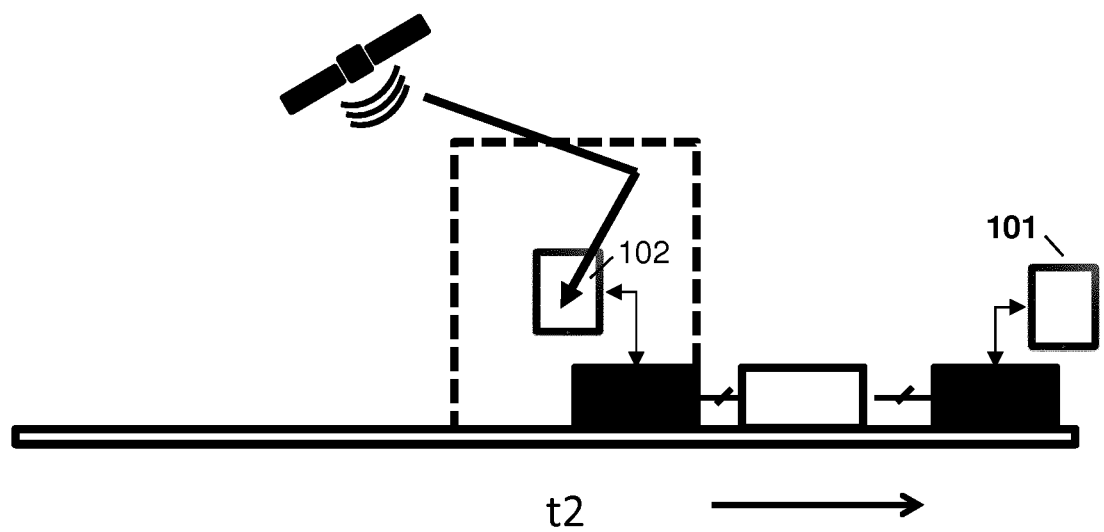

FIG. 2 illustrates an embodiment of the invention for rail transportation systems.

The figure shows a train comprising a plurality of wagons 201, 202 and 203 provided with a plurality of receivers, e.g. Rx1 101 and Rx2 102. The geometry is known to a sufficient extent and this prior knowledge can be leveraged to improve positioning accuracy and/or reliability. Many different techniques can be used for this improvement. For example, there can be added some more constraints in a Kalman filter used to determine the position of a receiver. A satellite 230 of a constellation emits a GNSS signal 225, which is impaired by multipath reflections caused by a building or obstacle 220 when received by the receiver Rx1 101.

In a first step, the downstream position of the second receiver Rx2 102 is known or determined at a given instant t1 (e.g. directly or indirectly determined, fixed and known location, own GNSS positioning, etc).

At time t1, for example triggered by the receiver Rx1 or Rx2, the first receiver Rx1 101 determines its position (e.g. by a differential computation and/or by knowing the geometry of the train i.e. the distance between Rx1 101 and Rx2 102).

At time t1, the first receiver Rx1 101 also estimates multipath parameters and communicates these parameters to the second receiver Rx2 located downstream (processing time to determine multipath can be neglected, as well as the durations needed for the communications between Rx1 and Rx2).

In a second step, at time t2 (date at which Rx 102 is located at a position close to the one of Rx1 at time t1), Rx2 uses the received multipath parameters of Rx1 (which was previously located upstream) to improve its positioning. The duration (t2−t1) can be estimated in different ways (for example by odometry and/or inertial system and/or estimation of the future location of Rx2, in the specific case of a train). Alternatively or in addition, time stamping can be used. As an advantageous result, the position of Rx2 can be known with a sufficient accuracy. The (upstream) receiver Rx1 can pursue its "exploration" or "discovery" of environmental conditions, which will be further reassessed by downstream Rx2.

In other words, some particular geometrical conditions can advantageously constrain and simplify the initial technical problem. In a train, where a sequence of receivers will be located at the same spatial positions at different instants, but within a short timeframe, the use of data collected upstream can be leveraged for downstream uses.

Figure 3:
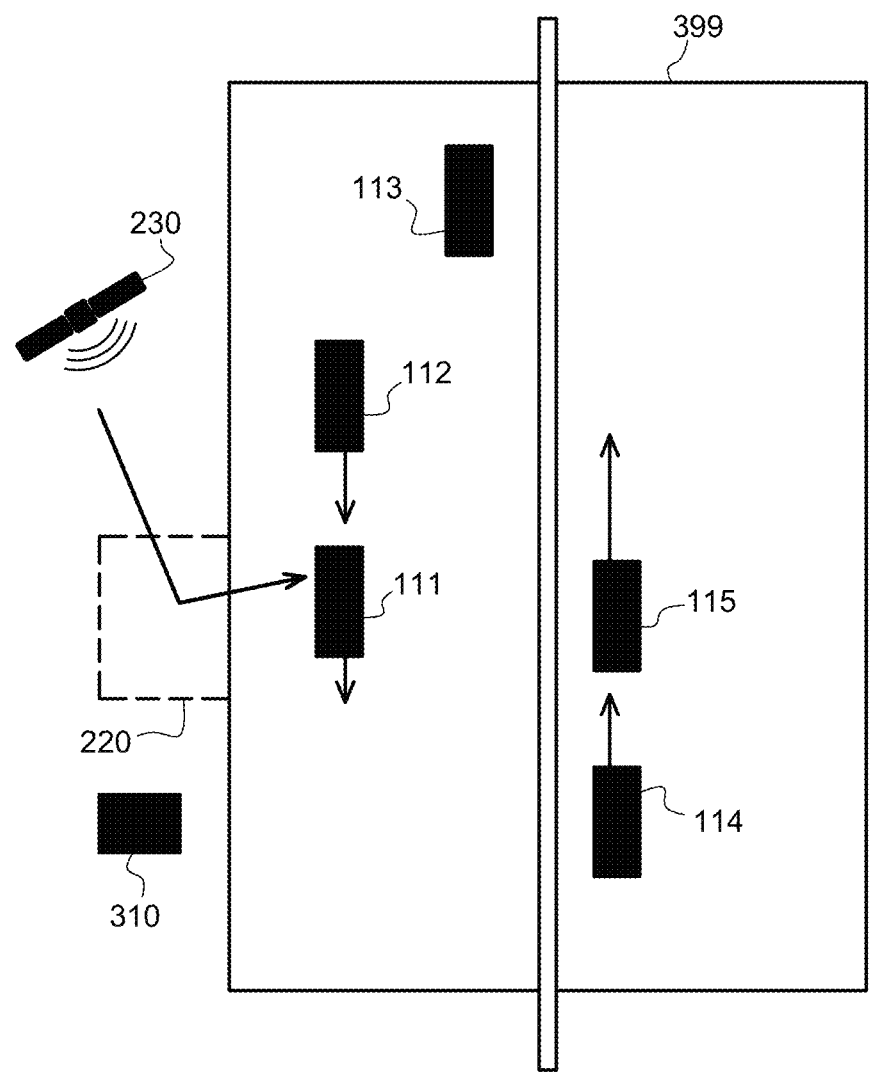
FIG. 3 illustrates an embodiment of the invention for a group of vehicles.

FIG. 3 illustrates an embodiment of the invention for a group of vehicles.

A group of vehicles or convoy designates motor vehicles or ships or aircrafts or UAV traveling together, or travelling on the same street/route and in the same direction.

Some other particular geometry can be described. The FIG. 3 illustrates a convoy of vehicles 111, 112, 113, 114, 115 on a road 399. Vehicles or transportation systems can be cars and/or trucks and/or aircrafts before take-off (e.g. taxiing) and/or drones (e.g. for delivery).

Said convoy entity for example can be a servo-system (interdependent automated or automatic or autonomous vehicles), entirely or in part. The convoy can be temporary (e.g. a system of systems, e.g. ever-changing groups of interdependent and independent transportation systems, with coalescence, ad hoc networks, etc). In other words, the perimeter of the "convoy" or "group of vehicles" can change over time.

As illustrated on the figure the upstream car 111 will get its GNSS signal from satellite 230 impaired by multipath caused by obstacle 220 but will receive PCP from car 112 which will then be able to improve its positioning.

Direct or indirect relationships (not shown) between vehicles can allow enhanced cooperation. For example, car 112 can communicate its improved position later in time to car 114. Other infrastructure instrumentations (e.g. fixed GNSS antenna or "base" 310, RFID in the ground/road, image recognition) can provide exact reference positions which can be further taken into account. Hardware implementations of the method according to the invention can be very diverse.

In an embodiment, two receivers can be necessary and sufficient to implement embodiments of the described method. For example, steps of the described method can be implemented in standard or existing GNSS receivers (no hardware modifications are required, to the exception of communication capabilities, if not already present). GNSS devices can execute a software program which can embody one or more of the described steps. In other words, an existing GNSS receiver can be modified in order to be able to receive and handle measures originating from another receiver and to implement the described steps for determining multipath.

In an embodiment, some steps of the method can be performed in a third entity such as a "server" or "processing logic", for example remotely accessed and/or local to the first receiver and/or to the second receiver. Physically the processing logic can be an extension circuit connectable to one of the GNSS devices. It also can be a pre-existing remote server. It can use processing resources of a smartphone nearby, etc.

Such a server or processing logic for example can calculate the position of the first receiver device from measurements of the first GNSS receiver. Such entity also can determine the spatial position, the code measurements and the carrier phase measurements of the second GNSS receiver. This entity also can estimate parameters representative of multipath reflections at the position of the first positioning device.

The role of the server or processing logic (or collection of servers) and the role of the receivers can be static over time (e.g. invariant configured) in some embodiments, but in yet some other embodiments ("decentralized or distributed models"), these roles of "server" and "receiver(s)" can be diversely allocated or even exchanged over time (e.g. by time intervals, by exchanging tokens, after collective votes, etc). For example, in an embodiment, there is no dedicated remote server hardware in the network (e.g. cloud): the role of the processing is endorsed by one of the two receivers, which then act as the "intelligent" or processing unit. In a "mesh" or "ad hoc" network of receivers placed in a same physical vicinity, peer receivers on the ground can evaluate each other and then vote for the best suitable receiver to endorse the "server" or "processing logic" role. This role for example can be endorsed for a limited timeframe. Various mechanisms can allow to re-allocate the role to other nodes or peer receivers, possibly on-the-fly (e.g. with copy of the remote server database, by implementing load-balancing mechanisms, if not some authentication or encryption mechanisms, etc). In some embodiments indeed, the "intelligence" or "processing resources" can be entirely distributed: receivers for example can each execute a part of the processing logic role, along with their own role of GNSS receivers (with sufficient redundancy) so that the fleet of temporary peers in a same location can cooperate (e.g. schemes of collaborative GNSS processing, peer-to-peer processing, cooperative processing).

One or more functions of the processing can be distributed across the solicited/solicitable receivers and/or servers. Some receivers of the fleet for example can perform parts of the computations required or useful to estimate multipath.

In some embodiments, the invention discloses a positioning device comprising a first GNSS receiver, 101, configured to output a first position of the positioning device; a communication link configured to receive from one or more of a second GNSS receiver, 102, or a positioning server one or more parameters representative of multipath at the first position; a processing logic configured to produce an estimate of a second position of the positioning device from the first position, a positioning model comprising residuals calculated at the first position and the one or more parameters representative of multipath at the first position; wherein the estimate of the second position is obtained by replacing the residuals by the one or more parameters. In such embodiments, the one or parameters may come from a second GNSS receiver that was present at the first position a moment before the measurement, said moment being sufficiently close to the moment of the measurement for the parameters to be still valid, as explained above. The parameters may be obtained from a server that stores a database of previously calculated multipath parameters. In some embodiments, the parameters applicable at the first position at the time of measurement are possibly selectable for a definite satellite in a definite constellation and/or for definite atmospheric conditions. In some embodiments, the parameters have been calibrated by applying the model used to calculate the residuals.

The disclosed methods can take the form of an entirely hardware embodiment (e.g. FPGA, SOC), an entirely software embodiment or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

The examples disclosed in this specification are only illustrative of some embodiments of the invention. They do not in any manner limit the scope of said invention which is defined by the appended claims.

The invention claimed is:

1. A positioning system comprising:
a first GNSS receiver; and
a second GNSS receiver;
wherein the first GNSS receiver and the second GNSS receiver are mounted on a train;
wherein the first GNSS receiver is configured to receive a spatial position, code measurements and carrier phase measurements of GNSS signals computed by the second GNSS receiver through a communication link;
wherein the first GNSS receiver comprises processing logic configured to:
calculate a position of the first GNSS receiver based on code measurements and carrier phase measurements of GNSS signals computed by the first GNSS receiver and based on the spatial position, the code measurements, and the carrier phase measurements of the GNSS signals received from the second GNSS receiver;
estimate one or more parameters representative of multipath at the position of the first GNSS receiver, the estimated one or more parameters being a residual difference between pseudo ranges measured by the first GNSS receiver and predicted pseudo ranges using said position of the first GNSS receiver, after deduction of modeled errors, wherein the modeled errors comprise satellite clock errors, receiver clock errors, ionospheric errors and tropospheric errors;
wherein the processing logic is further configured to communicate said one or more parameters representative of the multipath estimated at the position of the first GNSS receiver to the second GNSS receiver through the communication link, and
wherein the second GNSS receiver is configured to use said one or more parameters representative of the multipath estimated by the first GNSS receiver to adjust the computed GNSS position when the second GNSS receiver is within a specified range and within a specified timeframe of said spatial position of the first GNSS receiver.

2. The positioning system of claim 1, wherein the one or more parameters representative of the multipath include one or more multipath severity indicators.

3. The positioning system of claim 1, wherein the processing logic is further configured to determine a relative distance between the first and the second GNSS receivers.

4. The positioning system of claim 1, wherein the one or more parameters representative of the multipath are associated with validity conditions in time and/or space.

5. The positioning system of claim 1, wherein the one or more parameters representative of the multipath are estimated for a plurality of satellites of a GNSS constellation.

6. A computer-implemented method of handling multipath with a first receiver and a second receiver, the method comprising the steps of:

determining, by the second receiver, a spatial position of the second receiver, code measurements of the second receiver, and carrier-phase measurements of the second receiver;
communicating, by the second receiver, the spatial position of the second receiver, the code measurements of the second receiver, and the carrier-phase measurements of the second receiver to a first receiver;
determining, by the first receiver, a spatial position of the first receiver based on the spatial position of the second receiver, the code measurements of the second receiver, the carrier-phase measurements of the second receiver, code measurements of the first receiver, and carrier-phase measurements of the first receiver;
estimating, by the first receiver, multipath parameters at the spatial position of the first receiver;
communicating, by the first receiver, said estimated multipath parameters to the second receiver; and
adjusting, by the second receiver, the spatial position of the second receiver based on said multipath parameters received from the first receiver when the second receiver is within a specified range and within a specified timeframe of said spatial position of the first receiver.

7. The computer-implemented method of claim 6, further comprising determining and communicating, by the second receiver, an indicator of the estimated accuracy of the spatial position of the second receiver to the first receiver.

8. The computer-implemented method of claim 6, further comprising determining, by the first receiver, the spatial position of the first receiver based on a differential positioning associated with the second receiver.

9. The computer-implemented method of claim 6 further comprising:
determining, by a third receiver, a spatial position of the third receiver, code measurements of the third receiver, and carrier-phase measurements of the third receiver;
communicating, by the third receiver, the spatial position of the third receiver, the code measurements of the third receiver, and the carrier-phase measurements of the third receiver to a first receiver;
communicating, by the first receiver, said estimated multipath parameters to the third receiver; and
adjusting, by the third receiver, the spatial position of third receiver based on said multipath parameters received from the first receiver when the third receiver is within the specified range and within the specified timeframe of said spatial position of the first receiver.

10. A plurality of computer-readable mediums comprising instructions for carrying out the steps of the method according to claim 6 when said instructions are executed by the first receiver and the second receiver.

11. The positioning system of claim 1, further comprising:
a third GNSS receiver mounted on the train, wherein:
the processing logic is further configured to communicate said one or more parameters representative of multipath to the third GNSS receiver, and
the third GNSS receiver is configured to use said one or more parameters representative of the multipath to adjust a GNSS position computed by the third GNSS receiver when the third GNSS receiver is within the specified range and within the specified timeframe of said position of the first GNSS receiver.

* * * * *